Patented Apr. 21, 1936

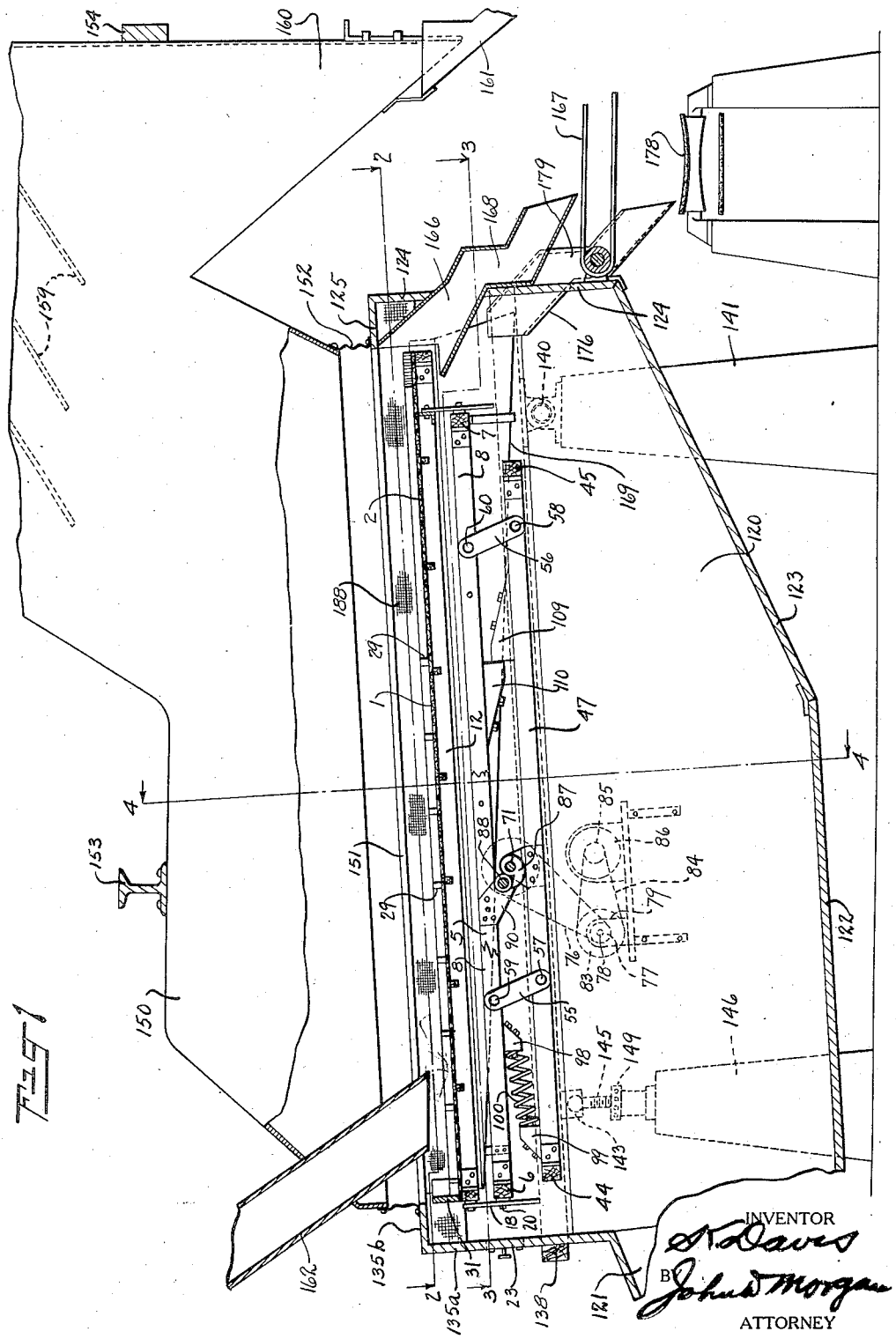

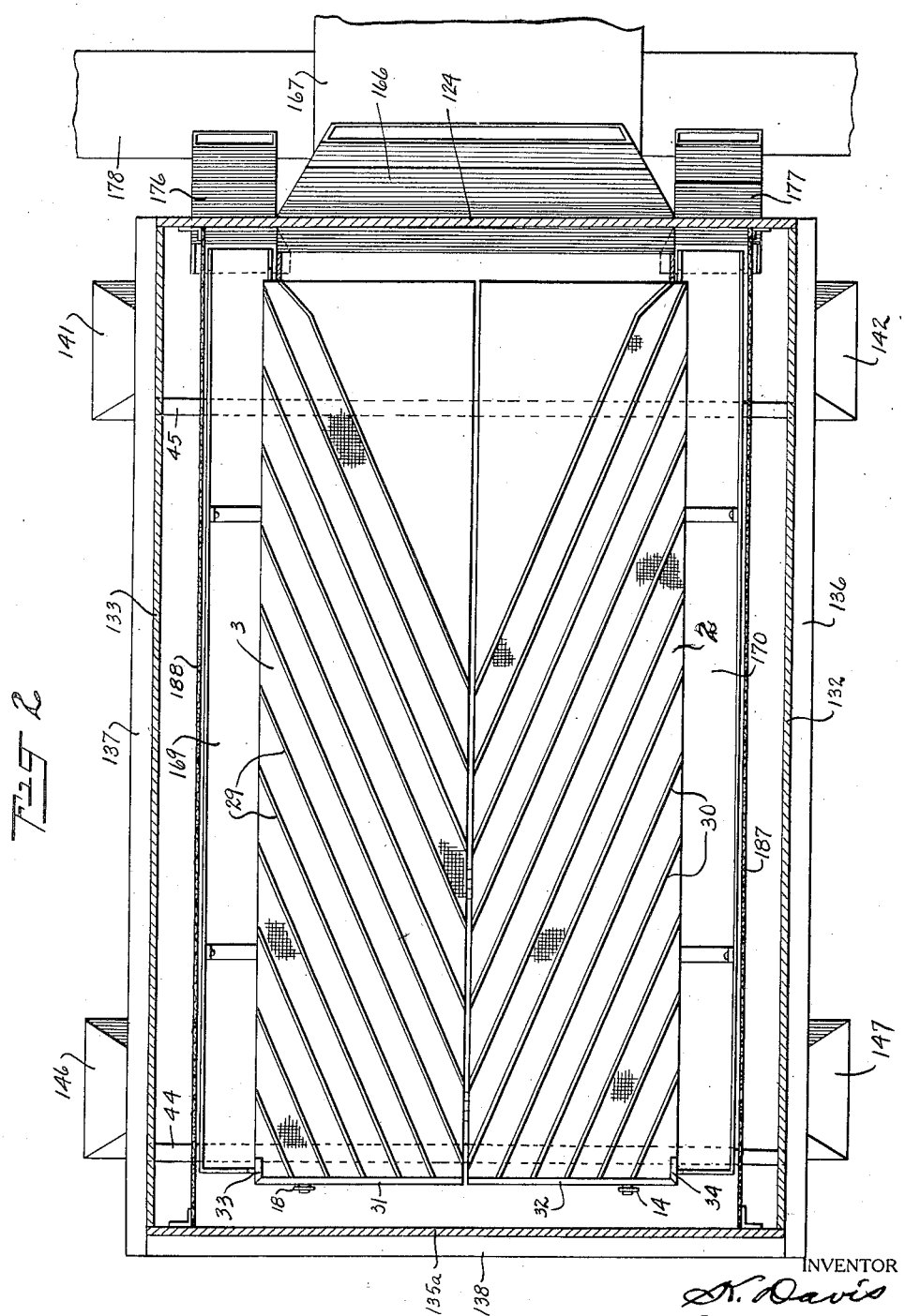

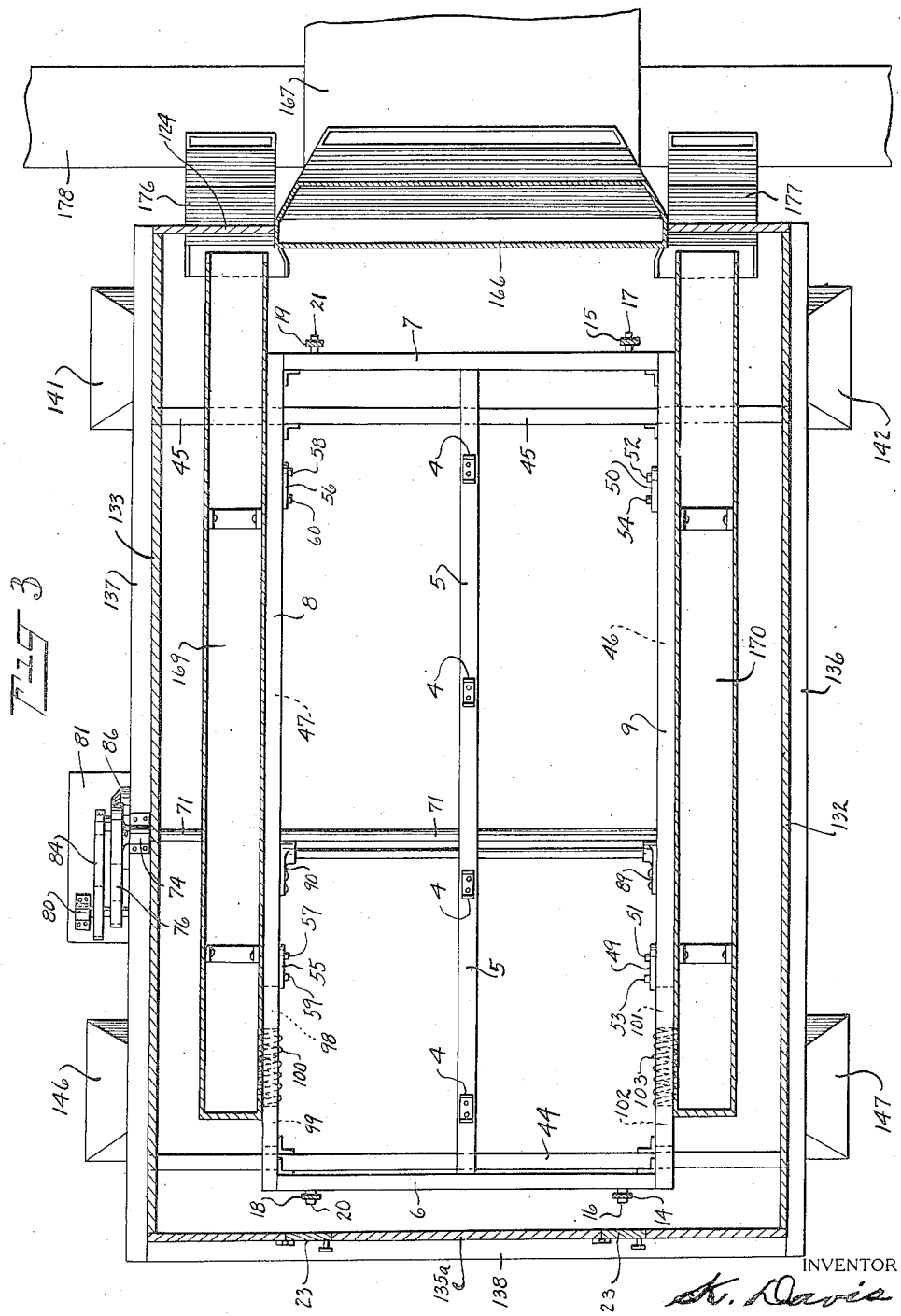

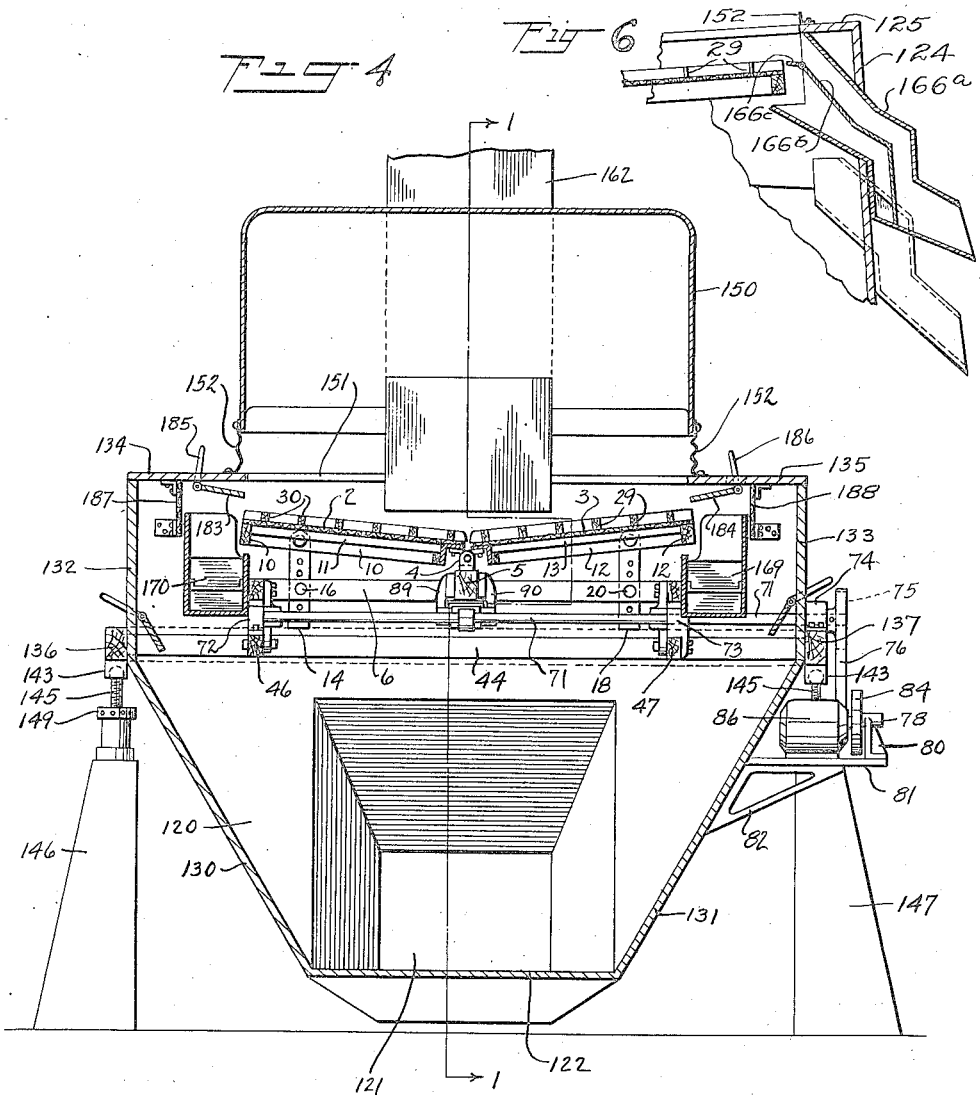

2,038,100

UNITED STATES PATENT OFFICE 2,038,100

PROCESS AND MECHANISM FOR SEPARATING INTERMIXED DIVIDED MATERIALS

Kenneth Davis, St. Benedict, Pa., assignor, by mesne assignments, to Peale-Davis Company, Wilmington, Del., a corporation of Delaware Application July 8, 1924, Serial No. 724,784
Renewed August 21, 1935

12 Claims. (Cl. 209—467)

The invention relates to a novel process and mechanism for separating intermixed divided materials of different specific gravities, and more especially for separating such materials where their differences in specific gravities are relatively small, and where the pieces or particles of material vary relatively greatly in size.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a central, vertical, longitudinal section, taken substantially on line 1—1 of Fig. 4;

Fig. 2 is a full horizontal section taken substantially on line 2—2 of Fig. 1;

Fig. 3 is a full horizontal section, taken substantially on line 3—3 of Fig. 1;

Fig. 4 is a full, vertical, transverse section, taken substantially on line 4—4 of Fig. 1;

Fig. 5 is a diagrammatic plan of the table, showing areas of different degrees of air perviosity; and Fig. 6 is a fragmentary, sectional view of a modified form.

It is highly desirable and economical in certain arts to separate intermixed divided materials which vary relatively slightly in their specific gravities, and the separation of which is further rendered more difficult by reason of the pieces or particles of the intermixed materials varying greatly in size. These properties and conditions greatly increase the difficulty of effecting thorough, rapid, and economical separation.

The term "divided" as used herein signifies materials which are naturally in separate pieces or particles or which have been broken into pieces or particles in the previous handling of or operations upon the material, and will be so understood.

One example of intermixed divided materials which vary but slightly in their specific gravities, while varying very much in the sizes of the different particles or pieces, is certain kinds of coal as they come from the mine. The pieces or particles thereof vary from fine dust through various sizes up to three inch pieces or lumps. Intermixed with the coal are pieces of rock, also varying in size from dust up to three inch pieces, the coal and the rock being relatively fairly close in their specific gravities. This problem is frequently complicated by the intermixture with the foregoing of pieces of "bony", which is intermediate the coal and rock in its specific gravity and frequently has coal adherent thereto.

The previous known procedure is to subject the intermixed materials to the process known as "sizing"; that is, separating and classifying the pieces and particles of the intermixed materials very closely as to size before attempting their separation from each other. That is, by screening or some equivalent operation, the inter-mixed materials are divided into separate groups or classes, the larger particles so separated or classified varying in dimension by say one-half inch, the next smaller by a quarter-inch, and the smaller sizes being frequently classified within the range of a sixteenth of an inch. This requires say ten preliminary sizing operations, with nine or ten machines, or sets of mechanism, and operations for effecting such sizings. This is all preparatory to separating the intermixed materials. Naturally, there are just as many separating mechanisms and separating operations following as there are sizes of material.

By the present invention, I provide a rapid, efficient and economical process and a single mechanism for thoroughly separating such intermixed divided and widely vari-sized materials at a single operation. Thus, by my invention the complete separation is effected by only one process and mechanism, thereby avoiding all the numerous, expensive and tedious sizing processes and operations, and all but one of the separating processes and operations, and also doing away with all sizing machines and all but one of the separating machines usually employed. That is, if there are usually ten sizes and nine sizing mechanisms, these are all saved or avoided; and nine separating operations and mechanisms are likewise saved or avoided.

Referring primarily to the general features of the present preferred and exemplary embodiment of the invention, briefly, structurally, a flat air pervious table to support a bed of the intermixed materials, is centrally, longitudinally hinged, and is mounted by the hinges on a longitudinally reciprocable or vibratable frame (adapted to receive an impact at the forward end of its stroke), which frame in turn is mounted on a non-reciprocable frame. All this structure is within an air-chamber, designed to direct air through the table and also inwardly across the table and against the side edges and top of the bed of materials thereon.

Somewhat more fully, an air pervious supporting table for the bed of intermixed materials is preferably centrally longitudinally divided, and each part is independently transversely and angularly variably positionable about a central, longitudinally-extending axis to vary the inclination of the bed from the center outwardly toward the side edges. For many kinds of materials the bed is inclined from its central longitudinal axis upwardly and outwardly to both of its side edges.

The table and the bed of materials thereon are vibrated or reciprocated through a relatively short path, substantially longitudinally of the bed, preferably with a slight upward and forward movement, and also preferably terminating in a sharp impact at the forward end of the path or stroke.

On the surface of each half or part of the table, and projecting upwardly therefrom, are a plurality of separating partitions, extending forwardly and outwardly from the inner side edges of the two parts to the outer side edges thereof.

Air under pressure is blown or drawn upwardly through the table, the force thereof being variably controlled in the various parts or areas of the table, and a dust collector separates from the air current the dust which it has carried up from the bed of materials on the table.

The intermixed materials are fed on to the rear end of the table in just the quantity required by the capacity of the table, so as to keep the bed in practically uniform quantity and condition and most favorable for the separating operation. The intermixed materials are fed on in this manner usually through a chute onto the rear central part of the table.

The separating action will be described later in detail, as it is at present understood, but may be briefly stated to be a gradated or serial separation of the pieces of rock and coal behind successive separating partitions by the air action, as the materials move forwardly along the table, the rock settling upon the table and the coal being floated by the air currents. By the concurrent mechanical reciprocation and impaction of the table, the bed of materials moves gradually and slowly forwardly the separating action just described proceeding meanwhile. As the coal is separated it is floated above the separating partitions, and travels along the table, to be discharged at the front end. As the rock is separated, it settles upon the table behind one of the separating partitions, it is propelled forwardly by friction and inertia but is constrained and impelled outwardly by the separating partitions and is discharged over the side edge of the table.

It will be understood that the foregoing general description, and the following detailed description as well, are exemplary and explanatory of the invention, and certain further features of the mechanism and process will be set forth primarily in connection with the detailed description.

Referring now in detail to the embodiment of the invention illustrated by way of example in the accompanying drawings, a table 1 for the bed of intermixed divided materials is provided, the table being constructed of air-pervious material, such as perforate metal plate, wire gauze, or other suitable material. The table is usually inclined longitudinally in an upward and forward direction, and means are provided for varying the angle of inclination of the table, as will be later described.

The table (Figs. 1, 2, and 4) is likewise transversely variably inclinable, and as embodied, it is divided centrally into two longitudinal parts or sections 2 and 3, the two parts being independently vertically variably inclinable. For this purpose each of the two parts or sections 2 and 3 of the table has a separate supporting frame. Part 2 of the table has a rectangular supporting frame 10 underneath, with two end and two side reaches, and with intermediate cross-pieces 11, upon which frame the air pervious table 1 rests and to which it is attached. In like manner, part 3 of the table has a rectangular frame 12, with two end and two side reaches and with intermediate cross pieces 13, upon which frame the air pervious table 1 rests and to which it is attached.

The inside or central longitudinal reach of each of the frames 10 and 12, of the parts 2 and 3 of the table are supported on hinges. These two reaches are of angled cross section (Fig. 4) and fastened thereto at various points therealong are hinges 4, the hinges being also mounted upon a longitudinally disposed member 5 of the reciprocable frame.

The embodied reciprocable frame, just referred to, comprises cross frame members 6 and 7 to the central part of which the frame member 5 is joined at either end. The cross frame members 6 and 7 at their respective ends are jointed to longitudinally-disposed side frame members 8 and 9, which are parallel to the frame member 5.

For the purpose of variably inclining the table parts 2 and 3, and holding them in the desired position, there is provided near the outside corners of both the front and rear ends, respectively, of the table part 2 a pair of pivotally-connected and downwardly-extending supporting bars 14 and 15, having holes therein through which project pins 16 and 17, respectively, the pins fitting into holes in the corresponding end pieces 6 and 7 of the frame. On the opposite side of the table, in the part 3, there is a similar device, the downwardly-depending, pivotally-mounted perforated bars being numbered 18 and 19 and the corresponding pins 20 and 21. Access to these devices is provided by small doors 23 in the air chamber walls. Thus each half 2 and 3 of the table 1 may be variably and independently inclined transversely, and usually the two parts of the table will be inclined upwardly and outwardly to the exterior side edges.

Upon the upper surface of each part 2 and 3 of the table 1 (Figs. 1, 2, and 4) are a series of separating partitions 29 and 30, respectively, consisting of relatively thin and low strips or plates, projecting upwardly, either perpendicularly or inclined from the surface of the table. The separating partitions are inclined forwardly and outwardly from the rear end and inner sides of the parts 2 and 3 of the table and are preferably parallelly arranged. In the present preferred form of Figs. 2 and 5, they extend from the aforesaid edges to the outer side edges but not to the forward edge of the table. At the rear of the two table parts are vertically-extending walls 31 and 32, which may be continued for a greater or less distance along the rear part of the side edges of the table parts 2 and 3, as shown at 33 and 34.

Means are provided for effecting longitudinal vibration or reciprocation of the table and the bed of intermixed materials thereon, this movement being usually through a very short path and in a slightly upward direction on the forward movement and in a corresponding downward direction on the return movement. Also, preferably, the forward movement terminates in a sharp impact or blow.

In the embodied form of such means (Figs. 2, 3, and 4), a stationary or non-reciprocable frame has a rear end member 44, extending across the machine and supported in the air chamber and by the general exterior frame of the machine. This stationary frame has also a front transversely-extending member 45, supported in a similar manner. Extending longitudinally between the cross frame members 44 and 45 are two longitudinal side frame members 46 and 47, which are positioned directly beneath the members 8 and 9 of the reciprocable frame.

In the embodied form of means of mounting the reciprocable frame on the non-reciprocable frame, a pair of supporting arms 49 and 50 are pivotally supported at their bottom ends at 51 and 52 on the frame member 46, and are likewise pivotally connected at their top ends at 53 and 54 to the longitudinal member 9 of the reciprocable frame. There is a like construction on the opposite side of the machine, there being a pair of arms 55 and 56, pivotally supported at their bottom ends at 57 and 58 on the longitudinal side member 47 of the non-reciprocable frame and having their top ends pivoted at 59 and 60, respectively, to the longitudinal side member 8 of the reciprocable frame. These arms are upwardly and backwardly inclined slightly, so that while the movement of the table is generally or approximately in the plane of the table there is also the slight rising and falling movement already described.

The embodied form of means (Figs. 1 and 3) for imparting the vibrational or reciprocatory movement to the table and for effecting the sharp impact at the forward end of the stroke, comprises a cam shaft 71, extending across the machine. This shaft is journaled at 72 and 73 in the side reaches 46 and 47 of the non-reciprocable frame, and also in a bearing 74 in the outside frame (later to be described). Any suitable form of driving means may be used. As shown, on the external end of shaft 71 is a belt pulley 75, over which runs a belt 76, the belt running also over a pulley 77, which is fixed on a shaft 78. Shaft 78 is mounted in bearings 79 and 80, fixed to and supported by a table 81, which table is carried by a bracket 82, fixed to the exterior side of the air chamber (later to be described). Fixed on shaft 78 is a belt pulley 83, over which runs a belt 84; the belt running also over a small pulley 85, fixed on the shaft of a motor 86, mounted on table 81. Fixed on shaft 71 is a cam 87, and cooperating therewith is a cam roller 88, which is journaled in a pair of arms 89 and 90, fixed to and extending downwardly and forwardly from the central longitudinal frame piece 5.

As embodied, spring-operating table-actuating means cooperate with the cam mechanism just described. On the underside, and near the rear end, of the member 9 of the reciprocable frame, is a downwardly-extending block 98. A cooperating upwardly-extending block 99 is fixed to the upper side of the frame member, and a powerful helical spring 100 is in compression between the two blocks, thus resiliently impelling the table forwardly. In like manner, on the opposite side of the machine, a downwardly-extending block 101 is fixed to the lower side of the member 8 of the reciprocable frame and a cooperating upwardly-extending block 102 is fixed to the upper side and near the rear end of the non-reciprocable frame member 47. A powerful helical spring 103 is in compression between the blocks 101 and 102, thus also resiliently impelling the table forwardly.

The cooperating stop and impact-creating mechanism comprises an upwardly-extending block 109, fixed to the upper side of the non-reciprocable frame member 46, and a cooperating downwardly-extending block 110 is fixed to the lower side of the side member 9 of the vibratable frame. A similar pair of stop and impact-creating blocks are located on the opposite side of the machine in similar relation but are not shown in the drawings.

It will be understood that as the cam 87 rotates in the counter clockwise position in Fig. 1, the table 1 will be pressed backwardly and slightly downwardly against the springs 100 and 103, and when the roller 88 reaches the drop of the cam, the table will be projected violently forwardly and slightly upwardly and will be stopped with sharp impact by the collision of the blocks 110 with their blocks 109. These are also located so that there is no impact between the cam roller and the cam.

Means are provided (Figs. 1, 3, and 4) for causing the upward air current through the table 1 and also for furnishing air-currents acting otherwise upon the bed of material as later described. In this embodiment, the means for variably longitudinally inclining the table cooperate constructionally with the air-current creating and directing mechanism. As embodied, an air chamber 120 has at its rear end an air-supplying conduit 121 opening thereinto. The air current is supplied by any suitable means, such as a blower fan (not shown). The bottom of the air chamber has a rear portion 122, slightly upwardly and forwardly inclined, and a forward portion 123 much more sharply similarly inclined. The front wall 124 of the air chamber is vertically disposed, and extends entirely across the machine, and has an inwardly-projecting plate or flange 125 at the top. This latter constitutes a part of a centrally-apertured top for the chamber, the air current and dust being carried away through the aperture.

The two side walls of the air chamber have their bottom portions 130 and 131 inclined upwardly and outwardly, and above these are, respectively, vertical portions 132 and 133. At the top edges of these vertical side walls are horizontal, inwardly-projecting plates or flanges 134 and 135 respectively. These, like flange 125 on the front, form part of the centrally-apertured top of the air chamber. The rear wall 135ª of the air chamber above the conduit 121 is vertically disposed, and has at its top a horizontal inwardly-projecting flange 135ᵇ constituting a part of the apertured top of the air chamber.

Thus the air chamber is beneath the entire table 1, and projects upwardly at either side thereof, but spaced apart therefrom, so that the air pressure or air currents may be utilized also along the edges of the bed, one manner of doing so being hereinafter described.

The means for variably inclining the table longitudinally (Figs. 1, 3, and 4), as hereinbefore indicated, is structurally cooperative with the air chamber. As embodied, there is a frame around the vertical side walls of the air chamber, comprising side reaches 136 and 137 and a rear cross reach 138, all fastened to the exterior of the walls to the air chamber. The cross frame members 44 and 45 of the non-reciprocable frame abut on the inner side of the air chamber walls in alinement with the side reaches 136 and 137 of the exterior frame, and they are all fastened together, making a strong unitary structure.

Near the forward end thereof, the two side reaches 136 and 137 of this exterior frame are pivotally mounted by hinged bearings 140, respectively, upon supports or pillars 141 and 142. Near the rear ends thereof, these side reaches of the exterior frame have on the underside thereof, respectively, sockets 143, each constituting a spherical or ball bearing for the top of screw posts 145, respectively, which are mounted on supporting pillars 146 and 147. By turning the nuts 149, the table may be raised or lowered angularly about the hinged bearings 140 and the longitudinal inclination of the table may be thus varied as desired.

There is provided, also, in the present embodiment, means for collecting the dust taken from the bed of materials by the air currents. As embodied, a hood-like cover 150 is carried by supports 153 and 154, and is located above the large central aperture 151 in the top cover of the air chamber, this aperture being preferably of substantially the same area as the table 1. This hood is vertically spaced apart or separated from the top of the air chamber, and is connected thereto by a flexible, air-impervious fabric 152, fastened at its upper edge to the lower edge of the hood 150 and at its lower edge to the top of the air chamber.

The dust collector may be of any suitable form, but as shown herein, it is the same as, or substantially similar to, that shown in my copending application Ser. No. 612,456 filed Jan. 13, 1923, now Patent No. 1,959,125. It has an enlarged upper portion in which the air is permitted to expand and its velocity thereby decreased, so that the dust suspended in the air current is allowed to settle. Baffle plates 159 may also be provided for deflecting the dust downwardly into a dust collector 160, which may be emptied into a chute 161.

Means are provided in accordance with one feature of the invention for gradually feeding on a supply of the intermixed divided materials at the capacity of the table, so that the bed of materials upon the table may be kept intact or in substantially uniform condition, and this means may be of any desired form, so far as concerns many features of the invention. For example, this means may be the same as, or substantially similar to, that shown in my copending application Ser. No. 716,322 filed May 28, 1924, now Patent 1,786,740. In the present instance, this mechanism is indicated generally by a chute 162, which feeds on the intermixed divided materials to the rear and central part of the table 1 at the rate and in the quantity required for maintaining the bed of materials in proper condition upon the table, the chute passing in through the wall of the dust hood 150.

Means are provided for delivering the separated lighter material, such as the coal, from the front end of the table, and as embodied, a chute 166 is mounted in the front wall of the air chamber, with its inner or receiving end extending entirely across and in front of and beneath the front end of the table 1. The chute extends downwardly and discharges onto a conveyor belt 167. The chute is provided with one or more properly formed bends adapted to always maintain a certain amount of the separated material to act as an air lock to prevent the escape of air from the air chamber.

The delivery means for the heavy material, say the rock, comprises two longitudinally-extending chutes 169 and 170, located respectively at the outer side edges of the parts 2 and 3 of the table. These chutes are supported by being fixed to the side reaches 8 and 9 of the vibratable or reciprocable frame. These chutes are forwardly and downwardly inclined so as to convey away the material partly by their inclination and partly by the reciprocation and impact imparted to the table and to these chutes by reason of their being fixed to the reciprocable frame.

As the chutes are mounted upon the frame, it is not necessary to raise and lower them in the changing of the transverse inclination of the two parts of the table 1. These chutes at their forward ends discharge, respectively, into chutes 176 and 177, mounted in the front wall of the air chamber and discharging onto a traveling conveyor belt 178. These chutes likewise are provided with angled portions 179 for retaining a portion of the rock to act as an air lock to prevent the escape of air from the air chamber.

Means are provided by the invention (Figs. 1, 2, and 4) for directing an air current inwardly at or over the side edges of the bed of material upon the table 1, so as to direct backwardly and forwardly any coal or other lighter material arriving at the side edges of the table where the rock or other heavier material is discharged. This is effected in the present instance through the extension of the air chamber above the table, whereby a passage is formed or provided about and past the edges of the conveyors and of the table. There is thereby effected or provided an inwardly traveling current of air along the entire outer edge of each part of the table and directed inwardly against and over the side edges of the bed of material. If desired, baffles or damper plates 183 and 184 (Fig. 4) may be provided at either side to direct the air current somewhat downwardly and to also increase its intensity if desired. These baffle plates may extend the full length of the table with their axes extending longitudinally thereof and are mounted in the front and rear walls of the air chamber. Handles 185 and 186 may be provided for positioning the baffles as desired to control the direction and intensity of the air. There are also shown at either side of the air chamber, just outside of the chutes 169 and 170, vertically-disposed and longitudinally-extending air-pervious baffle plates 187 and 188, supported at either end upon the front and back walls of the air chamber. These prevent particles of rock or other material from flying across the chute and dropping down into the air chamber.

In accordance with one feature of the invention, means are provided for regulating the intensity of the air currents in different parts of the table 1, so as to best effect the separating and delivering action in that part of the table. With certain kinds and physical conditions of intermixed divided materials, it will be found most advantageous or efficient to have the air perviosity of the table increased forwardly and inwardly, although it will be understood that this arrangement may be varied to suit different kinds of materials and materials in different physical conditions. While the air current action is quite gradually and minutely gradated so far as concerns the entire area of the table, or of the two parts of the table, this may be effected in practice by having successive relatively small areas of the table of different degrees of air perviosity, but each area being of equal perviosity throughout, that is, with respect to itself.

In Fig. 5 there is a diagrammatic showing of one such arrangement, the relative degree of perviosity being indicated by the letters a to h, the letter a indicating the greatest degree of perviosity and the letter h the least degree thereof. In this arrangement, the perviosity decreases forwardly and outwardly along the table.

The manner of operation of the hereinbefore described mechanism is substantially as follows:—

The table may be considered as in operation with a bed of materials thereon of a thickness well adapted for efficient separation, say about five or six inches in thickness. The air blast is on, and the table is rapidly reciprocated with the motion already described, terminating in the rapidly recurrent blows or impacts at the forward end of the strokes.

The material is fed on to the rear central part of the table, which is the area of strongest air blast or air current. The action of the air current is to float and to project upwardly the lighter material, and also to separate all the particles or pieces of the intermixed material from each other. The air blast is regulated so that the largest pieces of the heavier material, such as the rock, sink immediately to rest upon the table. It is likely, however, that the lighter pieces or rock are floated or suspended to a greater or less degree, but at a lower level than the coal, and especially the smaller pieces of the coal.

The pieces of rock which have settled upon the table are impelled forwardly by the reciprocatory and impactive mechanical action, and due to friction and inertia tend to move forwardly along the table as they rest thereon. However, the forwardly and outwardly disposed separating partitions constrain the sliding pieces of heavier material outwardly as well as forwardly, and they gradually slide to and are delivered over the side edges of the table.

The separating and stratifying action are not completed at this first stage just described, as it is probable that while the heavier pieces of rock come to rest almost immediately upon the table and the smaller particles of coal almost immediately reach the top of the bed, the smaller pieces of rock and the larger pieces of coal are still intermixed. Due to the mechanical action and the position of the table, the general trend or impulse of the materials is forwardly. The separating partitions not only act to impel or constrain the rock resting upon the table outwardly, but they act also to further separate the still intermixed portions of rock and coal.

Taking for example, an area on the table slightly forwardly of the rear end where the material is fed on, the upwardly rushing air current will further float the pieces of coal upwardly, but some of the still intermixed rock will settle behind these particular separating partitions, due to the relative decrease in the intensity of the air current. Again, the rock which has settled upon the table will be impelled forwardly by the reciprocation of the table and the impact, but at the same time will be constrained or impelled outwardly to and over the side edges of the table by the separating partition. On the other hand, the pieces of coal will be floated above the tops of the separating partitions and will be impelled forwardly toward the front end of the table but will be under no impusion to spread out laterally. Furthermore, the currents of air directed inwardly against the side edges and over the top of the bed will tend to keep and to direct the coal towards the central part of the table.

The material separating and directing action just described, will be gradually repeated, really in a plurality of successive separating and material-forwarding operations along the table, both toward the front ends and toward the side edges of the two parts, the separation gradually becoming more and more complete and finally separating the finest dust of the rock and the largest pieces of the coal from each other. It will be seen that as soon as the rock settles, its tendency to remain at rest upon the table is greater and greater, as it is now at the bottom of the bed and is continually traveling towards areas of the table where the air pressure is less and less. The combined outward and forward upward inclinations of the table will also operate to somewhat retard and render more thorough the separating action.

In Fig. 6 a modified form of the mechanism is shown, wherein the separating partitions 29 are continued down to the front end of the table. In this form also, the table is preferably air pervious to the front edge thereof, whereas in Fig. 5 the space in front of the separating partitions 29 at the front end of the table is preferably impervious to air. In this form, and with certain intermixed materials, the very finest particles or dust of the rock may be delivered at the front edge of the table as a thin stratum underneath the layer or stratum of separated coal traveling over the front edge of the table above it.

To separately deliver the clean coal and the thin layer of rock underneath it, the chute 166ª has an internal partition 166ᵇ, the clean coal passing to the conveyor belt through the uppermost passage and the rock passing to its conveyor belt through the lowermost passage. The edge or lip 166ᶜ is made adjustable to variations in the thickness of the underneath layer of rock dust, thereby effecting a clean delivery between the rock and coal.

It will be understood that the theory of operation propounded is my best present understanding of the process and actions occurring in the bed, but may be changed or modified as the result of further experience and observation.

From all the foregoing, it will be understood that a process and mechanism for separating intermixed divided materials has been provided, which realizes the objects and advantages hereinbefore set forth, together with other objects and advantages. It will be further understood that changes may be made from the precise manner of carrying out the steps of the process, and from the exact constructions of mechanism herein shown and described, without departing from the principles of the invention and without sacrificing its chief advantages.

What I claim is:—

1. A mechanism for separating intermixed divided materials of different specific gravities including in combination means for supplying a bed of the intermixed materials, and means for separating them in the bed and moving the lighter separated material along the bed and the heavier separated material forwardly and outwardly along, and over a side edge of, the bed, and means for directing an air current against the side edge of the bed.

2. A mechanism for separating intermixed divided materials of different specific gravities including in combination means for supplying a bed of the intermixed materials, and means including partitions for stratifying and separating them and impelling them along the bed and delivering the heavier material over a side edge of the bed, and means for directing an air current against the side edge of the bed.

3. A mechanism for separating intermixed divided materials of different specific gravities including in combination means for supplying a bed of the intermixed materials, means for separating the materials by air flotation of the lighter material, means acting by friction and inertia for progressing the heavier material forwardly and outwardly and discharging it over the side edge of the bed, and means for directing an air current against the side edge of the bed.

4. A mechanism for separating intermixed divided materials of different specific gravities including in combination a transversely inclined air pervious table for supporting a bed of the intermixed divided materials, means for forcing air upwardly through the table, means for reciprocating the table, and diverging separating partitions on the table extending forwardly and outwardly and upwardly to the upper side edges of the table and means for directing an air current against the side edge of the bed.

5. A mechanism for separating intermixed materials comprising in combination an air pervious table, means for forcing air upwardly therethrough, diagonally extending partitions for directing heavier materials to the side edge of the table, and means at said side edge of the table for directing air inwardly of the table for moving the lighter materials inwardly.

6. The process of separating intermixed divided materials differing relatively little in their specific gravities, and the particles of which vary relatively greatly in size, such as unsized coal, which comprises feeding and maintaining upon an air-pervious, longitudinally-reciprocated table a bed of the materials of substantial thickness progressing slowly along the table and gradually undergoing separation by horizontal stratification, passing lifting air currents upwardly through the bed to loosen the materials apart and to float the coal as a clean superior stratum, the heavier impurities gradually sinking to rest upon the table, and impelling said heavier impurities laterally by friction and inertia, as soon as they settle to an inferior stratum, to discharge substantially immediately at the side edge of the bed and imposing a yielding resistance at the edge where the heavier impurities discharge to prevent remixing of the materials.

7. The process of separating intermixed divided materials differing relatively little in their specific gravities, and the particles of which vary relatively greatly in size, such as unsized coal, which comprises feeding and maintaining upon an air-pervious, longitudinally-reciprocated table a bed of the materials of substantial thickness progressing slowly along the table and gradually undergoing separation by horizontal stratification, passing lifting air currents upwardly through the bed to loosen the materials apart and to float the coal as a clean superior stratum, the heavier impurities gradually sinking to rest upon the table, and impelling said heavier impurities laterally by friction and inertia, as soon as they settle to an inferior stratum, to discharge substantially immediately at the side edge of the bed, and imposing a yielding resistance, including air currents, at the edge where the heavier impurities discharge to prevent remixing of the materials.

8. A process for separating intermixed divided materials which comprises maintaining a bed of said materials upon an air-pervious table, longitudinally reciprocating the table and passing loosening and lifting air currents upwardly through the bed whereby the lighter materials float and the heavier materials settle to the surface of the table, impelling the settled heavier materials laterally along the surface of the table to discharge in a plurality of individual streams along the side edge of the table, progressing the flotant lighter material forwardly in a continuous stream to discharge at the front end of the table, and preventing lighter material from discharging with the heavier at the side edge of the table by directing a lateral current of air into the bed at the side edge of the table.

9. A mechanism for separating intermixed divided materials including in combination a longitudinally reciprocable, air-pervious table inclined transversely to the line of reciprocation, means for feeding material to the rear end of the table, a plurality of separating partitions on the table extending forwardly and transversely from the lower toward the upper side thereof for discharging settled heavier material in a plurality of streams along the upper side edge of the table, and means for regulating the discharge of said heavier material including devices for varying the transverse slope of the table and devices for directing an air current laterally into the bed and counter to the flow of the heavier material.

10. A mechanism for separating intermixed divided materials including in combination a transversely-inclined, air-pervious deck inclined longitudinally upwardly from the rear to the forward end thereof, means for longitudinally reciprocating the deck, means for maintaining thereon a bed of the materials undergoing separation, a plurality of separating partitions on the deck extending forwardly and outwardly toward the upper side of the deck, the air-pervious surface of the deck at the front end thereof terminating in a transverse line extending forwardly and from the lower to the upper side edge of the deck, and means for varying the transverse inclination of the deck.

11. A mechanism for separating intermixed divided materials of different specific gravities including in combination means for feeding the intermixed materials to the rear end of the bed, means for separating the materials by air flotation of the lighter material, means acting by friction and inertia for progressing the heavier material forwardly and outwardly, and means for producing a relatively flat, sheet-like current of air operating on the settled heavier material to prevent discharge of the coal therewith.

12. A mechanism for separating intermixed divided materials of different specific gravities including in combination means for feeding the intermixed materials to the rear end of the bed, means for separating the materials by air flotation of the lighter material, means acting by friction and inertia for progressing the heavier material forwardly and outwardly, and means for producing a relatively flat, sheet-like current of air operating on the settled heavier material to prevent discharge of the coal therewith and means for separately discharging the flotant lighter material.

KENNETH DAVIS.